(12) United States Patent
Nicolas et al.

(10) Patent No.: US 11,719,163 B2
(45) Date of Patent: Aug. 8, 2023

(54) BRUSH SEAL COMPRISING AT LEAST TWO GROUPS OF BRISTLES

(71) Applicant: SAFRAN AIRCRAFT ENGINES, Paris (FR)

(72) Inventors: Kévin Nicolas, Moissy-Cramayel (FR); Laurent Schweitzer, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 183 days.

(21) Appl. No.: 16/694,919

(22) Filed: Nov. 25, 2019

(65) Prior Publication Data

US 2020/0165977 A1 May 28, 2020

(30) Foreign Application Priority Data

Nov. 27, 2018 (FR) ........................................ 1871938

(51) Int. Cl.
*F02C 7/28* (2006.01)
*F04D 29/10* (2006.01)

(52) U.S. Cl.
CPC ................ *F02C 7/28* (2013.01); *F04D 29/10* (2013.01); *F05D 2220/32* (2013.01); *F05D 2240/56* (2013.01)

(58) Field of Classification Search
CPC ........ F02C 7/28; F05D 2240/56; F04D 29/10; F04D 29/102; F04D 29/104
See application file for complete search history.

(56) References Cited

U.S. PATENT DOCUMENTS

| 5,799,952 A * | 9/1998 | Morrison | F16J 15/3288 277/355 |
| 2004/0000760 A1 | 1/2004 | Aksit et al. | |
| 2004/0119237 A1* | 6/2004 | Datta | F16J 15/3288 277/355 |
| 2008/0007010 A1* | 1/2008 | Williams | F16J 15/3292 277/355 |

(Continued)

FOREIGN PATENT DOCUMENTS

| EP | 2 818 771 A3 | 12/2014 |
| WO | WO 92/14951 A1 | 9/1992 |

(Continued)

OTHER PUBLICATIONS

Official Communication dated Jul. 12, 2019, in corresponding FR Application No. 1871938 (9 pages).

*Primary Examiner* — Topaz L. Elliott
*Assistant Examiner* — Michael K. Reitz
(74) *Attorney, Agent, or Firm* — Bookoff McAndrews, PLLC

(57) ABSTRACT

A brush seal for a rotating machine, intended to be disposed between a first part and a second part of the rotating machine, the first and second parts being movable relative to each other about an axis, extending along an axial direction, the brush seal comprising a body intended to be attached to the first part, and a brush attached to the body, intended to be in contact with the second part, wherein the brush comprises at least a first group of bristles and a second group of bristles, at least one parameter of the bristles of the first group of bristles being different from the corresponding parameter of the bristles of the second group of bristles.

5 Claims, 5 Drawing Sheets

(56) References Cited

U.S. PATENT DOCUMENTS

| | | | |
|---|---|---|---|
| 2009/0066033 A1* | 3/2009 | Lusted | F01D 11/02 |
| | | | 277/411 |
| 2012/0326393 A1 | 12/2012 | Zheng et al. | |
| 2015/0021860 A1* | 1/2015 | Pekris | F16J 15/3292 |
| | | | 277/355 |
| 2016/0363224 A1* | 12/2016 | Deterre | F01D 25/16 |
| 2017/0268678 A1* | 9/2017 | Lutjen | F01D 11/003 |

FOREIGN PATENT DOCUMENTS

| | | |
|---|---|---|
| WO | WO 2004/085889 A2 | 10/2004 |
| WO | WO 2014/014426 A2 | 1/2014 |

\* cited by examiner

BRUSH SEAL COMPRISING AT LEAST TWO GROUPS OF BRISTLES

CROSS-REFERENCE TO RELATED APPLICATION(S)

This application claims priority under 35 U.S.C. § 119 to French Patent Application No. 1871938, filed Nov. 27, 2018, the entirety of which is incorporated by reference herein.

TECHNICAL FIELD

The present disclosure relates to a brush seal, as well as a rotating machine comprising the brush seal.

PRIOR ART

Brush seals comprising a body and a layer of bristles intended to come into contact with a rotor are known from the prior art. The layer of bristles comprises bristles for example made of metal or carbon. The layer of bristles thus allows providing tightness to a fluid between two spaces of a rotating machine.

However, since the amount of oil in the layer and its interaction with the bristles are not controlled, phenomena that are detrimental to the tightness may appear.

For example, an insufficient or excessive amount of oil may result in an increase in the air and oil permeability. These permeabilities may make these brush seals unsuitable for some applications with high tightness requirements.

DISCLOSURE OF THE INVENTION

The present disclosure aims at solving all or part of the disadvantages mentioned above.

For this purpose, the present disclosure relates to a brush seal for a rotating machine, intended to be disposed between a first part and a second part of the rotating machine, the first and second parts being movable relative to each other about an axis, extending along an axial direction, the seal comprising a body intended to be attached to the first part, and a brush attached to the body, intended to be in contact with the second part, wherein the brush comprises at least a first group of bristles and a second group of bristles, at least one parameter of the bristles of the first group of bristles being different from the corresponding parameter of the bristles of the second group of bristles.

It is understood that the brush is configured to isolate a first space from a second space.

For example, the first space comprises a fluid, such as oil, intended to lubricate the first and second parts of the rotating machine, while the second space comprises only air, and must not contain oil. The first space may also comprise oiled air, that is to say air laden with oil particles.

For example, the brush forms a layer of bristles.

The axis of the rotating machine is the axis of symmetry (or quasi-symmetry) of the latter. This axis corresponds to the axis of rotation of the rotating machine.

The axial direction corresponds to the direction of the axis of the rotating machine and a radial direction is a direction perpendicular to the axis of the rotating machine and intersecting this axis. Similarly, an axial plane is a plane containing the axis of the rotating machine and a radial plane is a plane perpendicular to this axis.

A circumference is understood as a circle belonging to a radial plane and whose center belongs to the axis of the rotating machine. A tangential or circumferential direction is a direction tangent to a circumference; it is orthogonal to the axis of the rotating machine but does not pass through the axis.

Unless otherwise specified, the adjectives internal/inner and external/outer are used with reference to a radial direction so that the internal part of an element is, along a radial direction, closer to the axis of the rotating machine than the external part of the same element.

It is meant by "group of bristles" a set of bristles representing at least 10% of the number of bristles of the brush.

It is understood that the bristles of the first group of bristles all have substantially the same first parameters that is to say to within 10%, preferably to within 5%.

It is understood that the bristles of the second group of bristles all have substantially the same second parameters that is to say to within 10%, preferably to within 5%.

Thanks to these dispositions, the tightness of the brush seal is improved and the interaction between the bristles and the amount of oil is better controlled. The brush seal according to the present disclosure therefore makes it possible to prevent the fluid from flowing along the axial direction between the first and second spaces. The brush seal according to the present disclosure can therefore be adapted for applications with high tightness requirements.

In some embodiments, the bristles of the first or second group of bristles are curled.

Thus, the tightness performance of the brush seal is improved.

In some embodiments, said at least one parameter is selected among the section, the length, and the physicochemical properties.

For example, the bristles of the first group of bristles having a first section, a first length and first physicochemical properties, the bristles of the second group of bristles having a second section, a second length and second physicochemical properties, the first and second sections and/or the first and second lengths and/or the first and second physicochemical properties being different.

Thus, the tightness performances of the brush seal can be adapted according to the situation. In addition, the manufacture of such a brush seal is easy.

It is meant by "physicochemical properties" the properties of the bristle, for example oleophilic, oleophobic, hydrophilic or hydrophobic properties due to, for example, the nature of a material and/or a coating and/or a texture of the bristle.

It can also be understood by "different physicochemical properties" that the bristles of the first group of bristles each comprise at least two portions having different sections and/or different physicochemical properties, and the bristles of the second group of bristles each comprise at least two portions having different sections and/or different physicochemical properties, the at least two portions of the bristles of the first and second groups of bristles being disposed at different locations on the bristle. For example, at least two portions are disposed alternately on the bristles of the first and second groups of bristles.

For example, the bristles of the first group of bristles each comprise a proximal portion, close to their root having a primary section and/or first primary physicochemical properties and a distal portion, close to their tip, having a secondary section and/or or secondary physicochemical properties; and the bristles of the second group of bristles each comprise a proximal portion, close to their root, having the secondary section and/or the secondary physicochemical properties, and a distal portion, close to their tip, having the primary section and/or the primary physicochemical properties.

In some embodiments, the length of the bristles of one of the groups of bristles is greater than the length of another group of bristles, for example by at least 50%.

For example, if the first length is greater than the second length, the first length is comprised between 3 and 4 millimeters, preferably between 3 and 3.5 millimeters; and the second length is comprised between 1 and 2 millimeters, preferably between 1 and 1.5 millimeters.

In some embodiments, the section of the bristles of one of the groups of bristles is greater than the section of another group of bristles, for example, by at least 50%.

It is meant by "diameter" of a bristle, the length of the largest segment of a section of a bristle.

For example, the first section and/or the second section are/is circular.

For example, if the first section is greater than the second section, the first section has a first diameter comprised between 20 and 50 micrometers, preferably between 30 and 40 micrometers; and the second section has a second diameter, the second diameter being comprised between 3 and 10 micrometers, preferably between 5 and 8 micrometers.

In some embodiments, the bristles of the first group of bristles are oleophobic and the bristles of the second group of bristles are oleophilic.

Thus, the oil or oiled water tightness performance of the brush seal is improved.

Indeed, since the oleophilic bristles allow trapping the oil particles and the oleophobic bristles allow repelling them, a barrier is formed between the spaces.

In some embodiments, the at least one parameter is the stiffness.

In some embodiments, the bristles of the first group of bristles comprise a first stiffness and the bristles of the second group of bristles comprise a second stiffness, the first and second stiffnesses being different.

In some embodiments, the plurality of bristles comprises at least a third group of bristles having a third length, a third section and third physicochemical properties.

The third length and/or the third section and/the third physicochemical properties is/are different from the first and/or second lengths, and/or from the first and/or second sections, and/or from the first and/or second physicochemical properties.

In other words, at least one parameter of the third group, among the third length, the third section and the third physicochemical properties, is different from the corresponding parameter of the first group and/or of the second group.

Thus, the tightness performance of the brush seal is improved.

In some embodiments, the bristles of the first and second groups of bristles are distributed in the brush in a non-periodic manner.

Thus, the tightness performance of the brush seal is improved. For example, the small-diameter bristles can fill the existing spaces between the large-diameter bristles. The brush thus has a greater density.

In some embodiments, the bristles of the first group of bristles are located at a central portion of the brush and the bristles of the second group of bristles are located at least at one peripheral portion of the brush, or vice versa, preferably along an axial direction.

Thus, the air-tightness is improved.

For example, the oleophobic bristles can be disposed on either side of the oleophilic bristles along the axial direction. The peripherally disposed oleophobic bristles make it possible to improve the oil-tightness, and the oleophilic bristles, at the center, make it possible to trap the oil. The oil and air tightness is therefore improved.

In other words, a group of bristles is located at a central portion and the other group of bristles, among the first and second groups of bristles, is located at a peripheral portion of the brush.

For example, in this case, it is understood that one of the groups of bristles is separated into two subgroups, framing the other group along the axial direction.

Thus, the tightness performance of the brush seal is improved.

In some embodiments, rows of bristles of the first group of bristles and rows of bristles of the second group of bristles are disposed alternately, preferably along an axial direction.

Thus, the tightness performance of the brush seal is improved.

In some embodiments, the first group of bristles comprises a first bristle density and the second group of bristles comprises a second bristle density, the first and second densities being different.

Thus, the tightness performance of the brush seal is improved.

In some embodiments, the bristle density of one of the groups of bristles is greater than the section of another group of bristles, for example, by at least 50%.

For example, the first density is comprised between 10,000 and 20,000 bristles/mm$^2$.

For example, the second density is comprised between 20,000 and 30,000 bristles/mm$^2$.

According to one embodiment, the bristles of the first group of bristles or of the second group of bristles are oleophobic except for their end portion, their end portion being oleophilic. Thus, the contact between the brush and the second part is lubricated thereby improving the performance of the brush seal. Indeed, better lubrication allows limiting the heating between the brush and the second part, which allows limiting the risk of coking of the oil and increasing the lifespan of the brush seal.

The present disclosure further relates to a rotating machine comprising a brush seal according to any one of the aforementioned embodiments.

BRIEF DESCRIPTION OF THE DRAWINGS

The invention and its advantages will be better understood upon reading the following detailed description of embodiments of the invention given as non-limiting examples. This description refers to the appended drawings, wherein.

DESCRIPTION OF THE EMBODIMENTS

Figure 1:
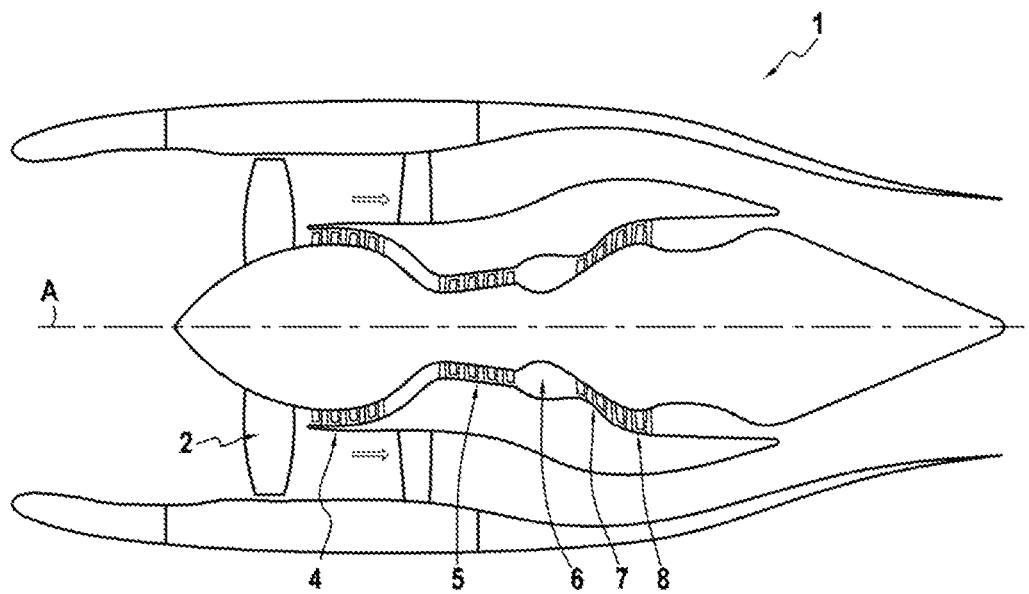
FIG. 1 represents a rotating machine.

FIG. 1 represents in cross-section along a vertical plane passing through its main axis A, a rotating machine 1, here a bypass turbojet engine 1. It includes, from upstream to downstream according to the circulation of air flow, a fan 2, a low-pressure compressor 4, a high-pressure compressor 5, a combustion chamber 6, a high-pressure turbine 7, and a low-pressure turbine 8.

Figure 2:
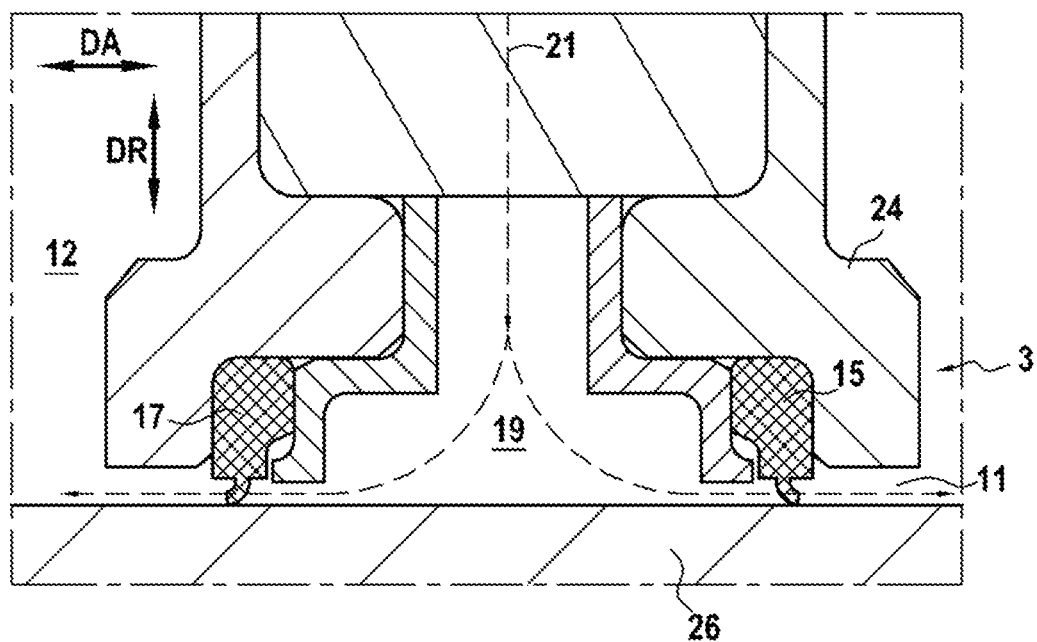
FIG. 2 represents a portion of a rotating machine comprising a bearing enclosure and a sealing device.

FIG. 2 represents a portion of a rotating machine 1 such as a turbomachine, comprising a bearing enclosure and a sealing device 3 between a first space, here the bearing enclosure 11, and a second space 12 of the rotating machine 1.

The bearing enclosure 11 comprises oil or oiled air, serving as a lubricant. The sealing device 3 comprises two brush seals 15, 17 axially spaced from each other and thus defining therebetween a sealing space 19. The brush seals 15, 17 extend substantially along a radial direction DR. The sealing space 19 is connected to an air supply, represented by the arrow 21, so as to maintain the sealing space 19 at a pressure greater than the bearing enclosure 11. The first brush seal 15 is disposed between the bearing enclosure 11 and the sealing space 19. The first brush seal 15 therefore provides air/oil or air/air oiled tightness. The second brush seal 17 is disposed between the sealing space 19 and the second space 12. The second brush seal 17 therefore provides air/air tightness. The second brush seal 17 essentially allows the creation of the sealing space 19, and thus the creation of a space that can be pressurized with respect to the bearing enclosure 11.

Figure 3:
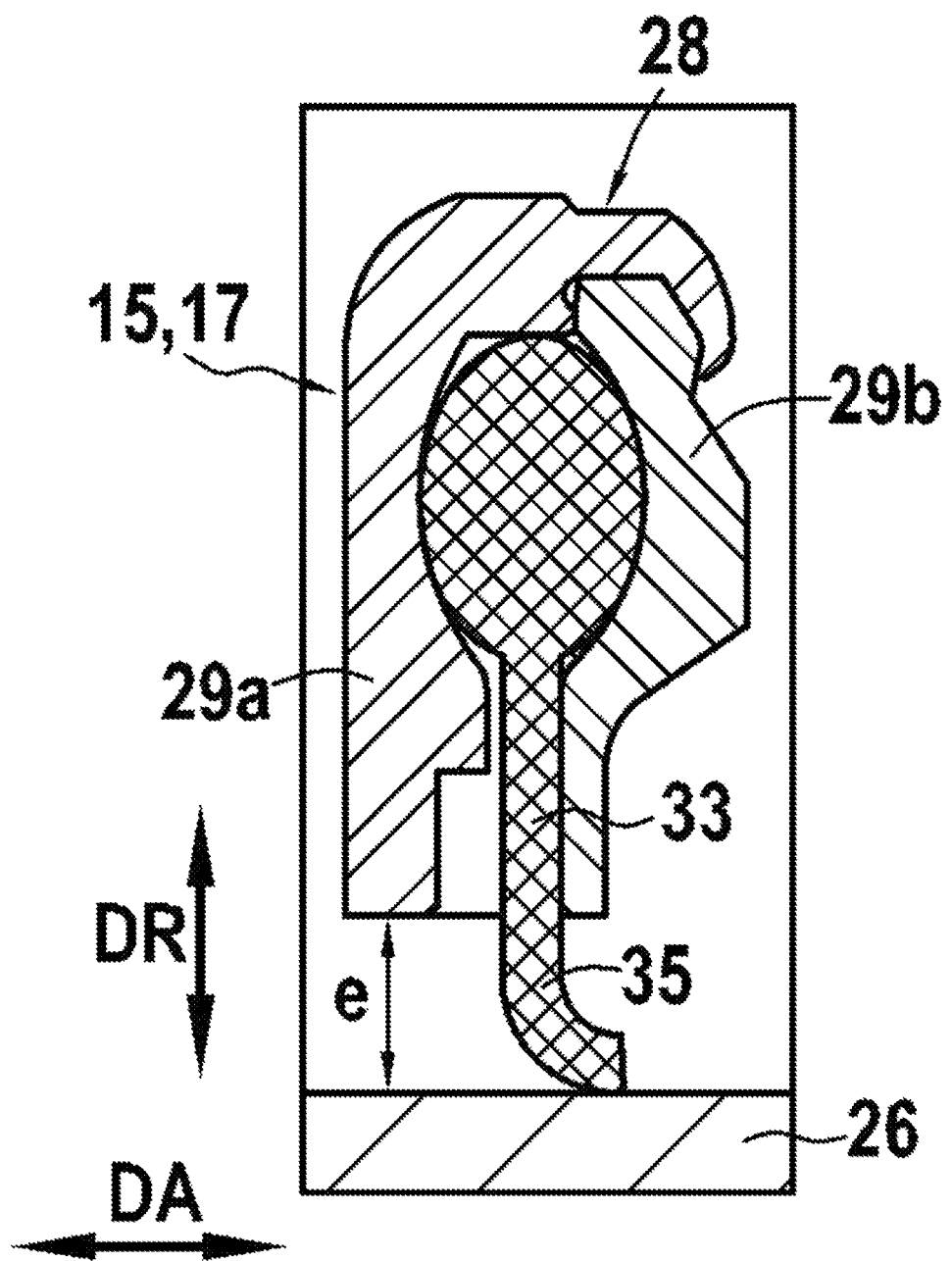
FIG. 3 represents a brush seal.

FIG. 3 represents a brush seal, which may be the first brush seal 15 or the second brush seal 17.

The brush seal 15, 17 is disposed between a first part 24 and a second part 26 of the rotating machine 1, movable relative to each other. In the present example, the first part is a stator 24 and the second part is a rotor 26. However, in other examples, each of the first and second parts could be rotating.

The brush seal 15, 17 comprises a body 28 intended to be attached, in this embodiment, to the stator 24. The body may be in the form of a ring 28. For example, the ring 28 comprises aluminum. As represented in FIG. 3, the ring 28 comprises two portions 29a, 29b, trapping a layer of bristles 33. For example, the bristles comprise a metal-based material, such as an alloy, or a carbon-based material, like carbon fiber such as that of the fiber range TORAYCA®, for example the models T700 or T800. The bristles of the bristle layer 33 protrude relative to the ring 28, here inwards, thus forming a brush 35. The brush 35 makes it possible to fill a clearance e between an inner end of the ring 28 and the rotor 26. The length of at least the longest bristles of the brush 35 protruding relative to the ring 28 is greater than the clearance e between an inner end of the ring 28 and the rotor 26. Thus, in operation, the bristles of the brush 35 bend in contact with the rotor 26, as represented in FIG. 3.

According to the present disclosure, the bristles of the brush 35 are not identical.

The intrinsic parameters of the bristles, for example the length, the section, the physicochemical properties, differ. Generally, the brush 35 comprises several groups of bristles, the bristles having, within the same group of bristles, substantially the same parameters.

Figure 4:
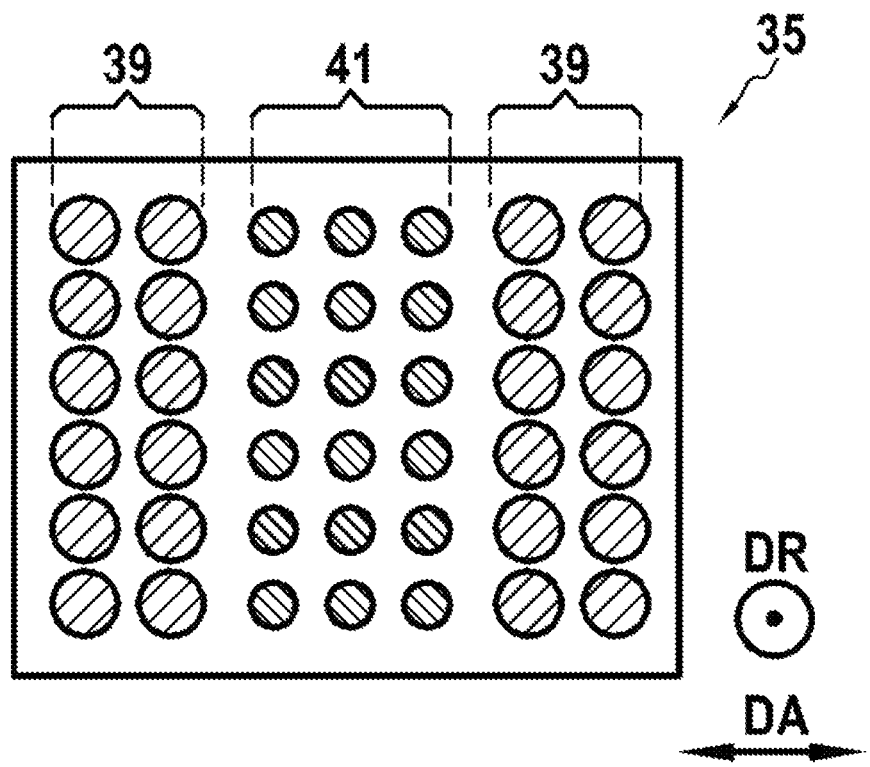
FIG. 4 represents a cross-section of a portion of the brush of the brush seal whose bristles have different sections.

FIG. 4 represents a first example of the type of bristles and of distribution of the bristles in the brush 35. Here, the brush 35 comprises a first group of bristles 39 and a second group of bristles 41. The bristles of the first group of bristles 39 all have substantially the same first section, and the bristles of the second group of bristles 41 all have substantially the same second section, the first and second sections being different.

In the represented example, the first section has a first diameter of 40 micrometers, and the second section has a second diameter is of 8 micrometers.

Figure 5:
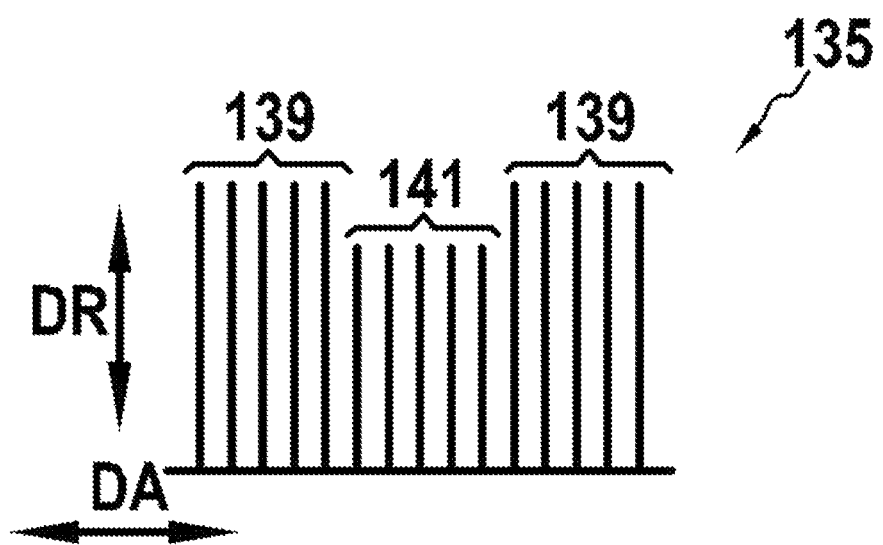
FIG. 5 represents a longitudinal cross-section of a portion of the brush of the brush seal whose bristles have different lengths.

In the exemplary embodiment represented in FIG. 5, the first group of bristles 139 is distributed over two different areas, peripherally along the axial direction DA. The second group of bristles 141 occupies a central area, disposed between the two peripheral areas occupied by the first group of bristles 139.

According to another exemplary embodiment, instead of, or in addition to, varying the section of the bristles between the first and second groups of bristles, it is possible to vary the length of the bristles between these two groups of bristles 139, 141, as represented in FIG. 5. Thus, the bristles of the first group of bristles 139 all have substantially a first length, and the bristles of the second group of bristles 141 all have substantially a second length, the first and second lengths being different.

In the example represented, the first length is of 2 millimeters, and the second length is of 3.5 millimeters.

In this example, the distribution of the groups of bristles 139, 141 in the brush 135 is similar to the distribution described in the previous example, represented in FIG. 4.

Figure 6:
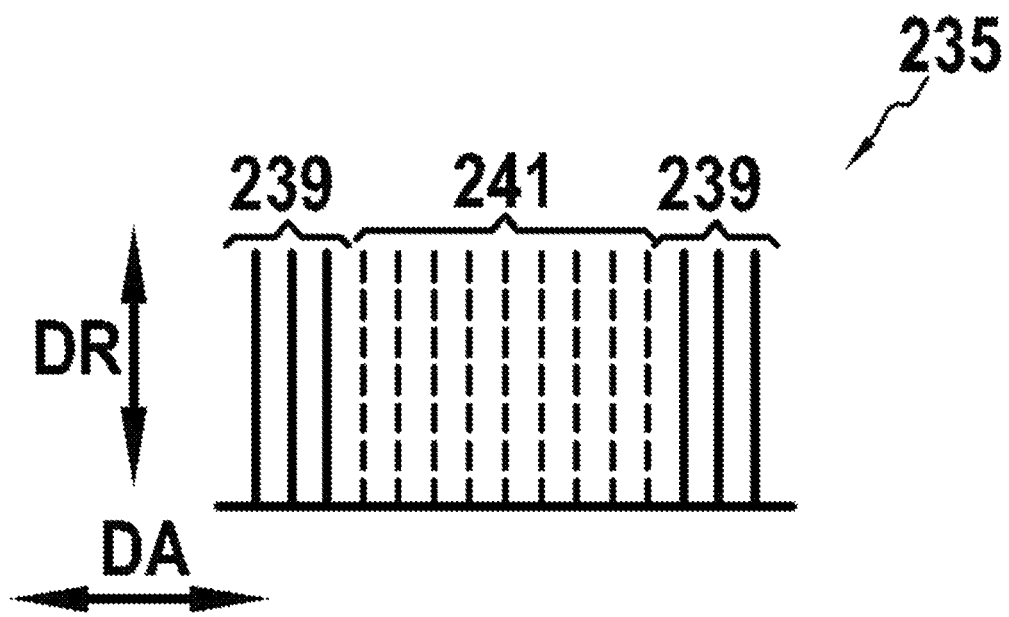
FIG. 6 represents a longitudinal cross-section of a portion of the brush of the brush seal whose bristles have different physicochemical properties.

According to another exemplary embodiment, represented in FIG. 6, instead of, or in addition to, varying the section and/or the length of the bristles between the first and second groups of bristles, it is possible to vary the material and/or the coating and/or the texture of the bristles between these two groups of bristles 239, 241, inducing different physicochemical properties between these two groups of bristles. For example, the bristles of the first group of bristles 239 (in solid lines) are oleophobic and the bristles of the second group of bristles 241 are oleophilic (in dotted lines). This configuration also has the effect of improving airtightness. To obtain these properties, the bristles of the first group of bristles 239 are coated with a deposition of soot, or with a more elaborate coating such as a deposition of polycarbonate or polystyrene, and the bristles of the second group of bristles 241 are made of polypropylene.

In this example, the distribution of the groups of bristles 239, 241 in the brush 235 is similar to the distribution described in the previous examples, represented in FIGS. 4 and 5.

Of course, the examples described above can be combined. For example, all the parameters described above, i.e., the section, the length and the physicochemical properties may be different from one group of bristles to the other at the same time. In this case, the first length, the first section and the first physicochemical properties are different from the second section, from the second length and from the second physicochemical properties, respectively. It is also possible to imagine that only two out of three parameters vary between the first and second groups of bristles.

As described, FIGS. 4, 5 and 6 represent, in addition, a certain distribution of the bristles along the axial direction DA. However, other distributions of the bristles could be envisaged, also making it possible to adapt the tightness performances of the brush seal 15, 17 according to the situation. Thus, other examples of bristle distribution are described below.

Figure 7A:
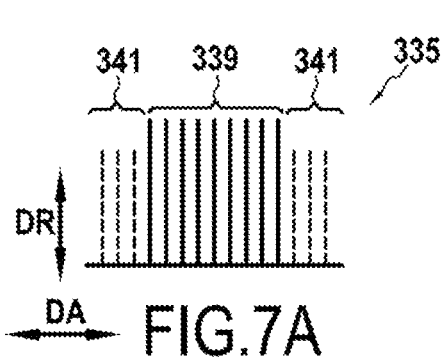
FIGS. 7A to 7D represent different distributions of bristles in the brush.

FIG. 7A represents one example of distribution in which the position occupied by the first and second groups is reversed with respect to FIGS. 4 to 6. Indeed, in this case, the first group of bristles 339 occupies a central area of the brush 335 while the second group of bristles 341 occupies a peripheral area of the brush 335, along the axial direction DA.

Figure 7B:
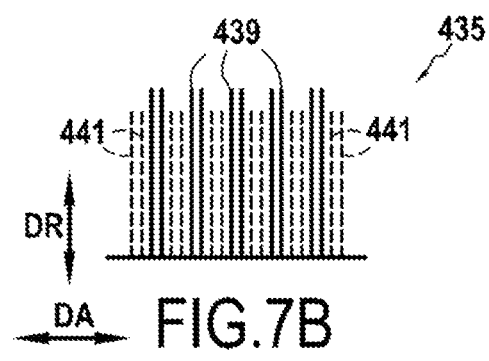

According to another example of distribution of the first and second groups of bristles within the brush 435, represented in FIG. 7B, rows of bristles of the first group of bristles 439 and rows of bristles of the second group of bristles 441 are disposed alternately, along the axial direction DA. FIG. 7B represents an alternation between two rows of bristles of the first group of bristles 439 and two rows of bristles of the second group of bristles 441. However, it is also to imagine an alternation between a row of bristles of the first group of bristles 439 and a row of bristles of the second group of bristles 441 or other configurations in alternation between the first and second groups of bristles, as represented in FIG. 7C.

Figure 7C:
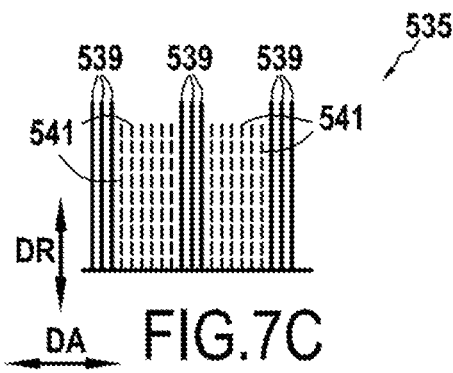

FIG. 7C represents another example of distribution in which the first group of bristles 539 is divided into three portions and occupies the two peripheral areas of the brush along the axial direction DA and a central area of the brush 535. In this case, the bristles of the second group of bristles 541 occupy the remaining areas. The bristles of the first and second groups of bristles are therefore equally distributed alternately.

Figure 7D:
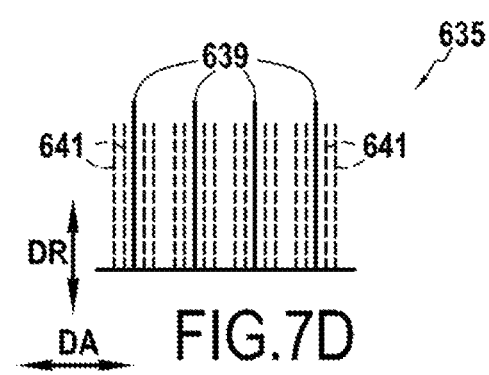

FIG. 7D represents another example of distribution where each of the bristles of the first group of bristles 639 is surrounded by bristles of the second group of bristles 641, thus forming a plurality of patterns. In the example represented in FIG. 7D, the different patterns are spaced from each other within the brush 635, thus leaving empty spaces therebetween.

Figure 8:
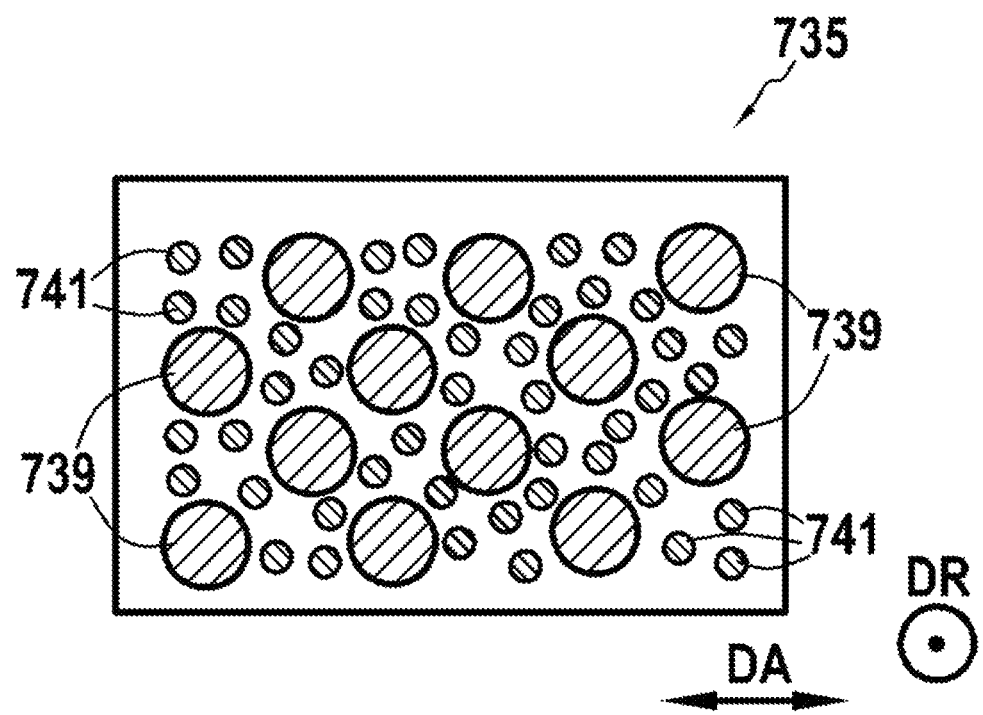
FIG. 8 represents a non-periodic distribution of the bristles in the brush.

According to another example of distribution of the bristles of the first and second groups of bristles, represented in FIG. 8, the bristles of the first and second groups of bristles 739, 741 are distributed non-periodically within the brush 735.

According to another example of a brush 835 represented at 9A, the bristles of the first group of bristles 839 each comprise several portions, for example oleophilic and oleophobic portions, disposed alternately along the bristle. In the same way, the bristles of the second group of bristles 841 each comprise several portions, oleophilic and oleophobic portions, disposed alternately along the bristle. The oleophilic and oleophobic portions of the first and second groups of bristles 839, 841 are disposed at different locations. The bristles of the first and second groups of bristles therefore have different physicochemical properties, due to the different distribution of the oleophilic and oleophobic properties along the bristles. In this example, a distribution of different physicochemical properties along the bristles is described, but a distribution of different sections along the bristle could also be considered, thereby inducing different physicochemical properties. For example, the same bristle could have several sections between its root and its tip, for example, a growing or decreasing section. A bristle could also comprise several sections and several physicochemical properties between its root and tip. In this example, the bristles have all the same length, but it is possible to imagine that the section and/or length of the bristles of the first and second groups of bristles is/are different.

In this example, rows of bristles of the first and second groups of bristles are disposed alternately.

Figures 9A, 9B:
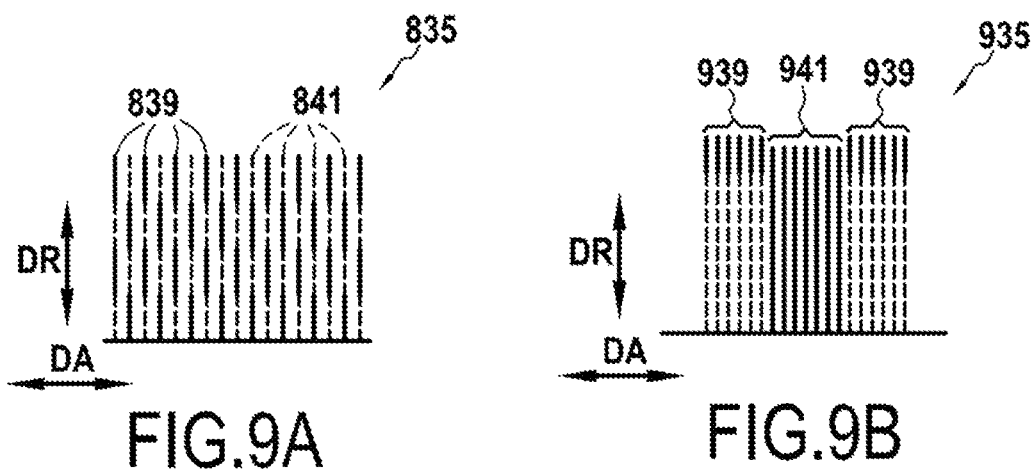
FIGS. 9A to 9B represent bristle arrangements in the brush, the bristles having a section or physicochemical properties that vary along the length of the brush.

According to one variant, represented in FIG. 9B, the bristles of the first group of bristles 939 comprise a portion at their root, being for example an oleophilic portion, and a second oleophobic portion at their tip. In addition, in this example, the bristles of the first group of bristles 939 are longer than the bristles of the second group of bristles 941. In these examples, the bristles of the first group of bristles 939 occupy the two peripheral areas of the brush 935 along the direction axial DA, and the bristles of the second group of bristles 941, here oleophobic bristles, occupy a central area of the brush 935 along the axial direction DA.

According to another embodiment, the density of bristles between the first and second groups of bristles differs. This is in particular the case of the example represented in FIG. 8. For example, the first group of bristles 739 comprises a first bristle density, for example 15,000 bristles/cm$^2$, and the second group of bristles 741 comprises a second bristle density, for example 25,000 bristles/cm$^2$.

According to another exemplary embodiment, one of the parameters of the groups of bristles may be the stiffness. The bristles of the first group of bristles 39 have a first stiffness and the bristles of the second group of bristles 41 have a second stiffness, the first and second stiffnesses are different.

Of course, all the combinations of parameters are possible, between the groups of bristles and possibly along the bristles.

Although the present invention has been described with reference to specific exemplary embodiments, modifications can be made to these examples without departing from the general scope of the invention as defined by the claims.

Particularly, individual characteristics of the various illustrated/mentioned embodiments can be combined in additional embodiments. Therefore, the description and drawings should be considered in an illustrative rather than restrictive sense.

What is claimed is:

1. A brush seal for a rotating machine, intended to be disposed between a first part and a second part of the rotating machine, the first and second parts being movable relative to each other about an axis, extending along an axial direction, the brush seal comprising a body intended be attached to the first part, and a brush attached to the body, intended to be in contact with the second part, wherein the brush comprises at least a first group of bristles and a second group of bristles, wherein the bristles of the first group of bristles are configured to repel the particles of oil dispersed in air, and the bristles of the second group of bristles are configured to trap the particles of oil dispersed in air, wherein rows of bristles of the first group of bristles and rows of bristles of the second group of bristles are disposed alternately with a repeated pattern.

2. The brush seal according to claim 1, wherein the bristles of the first group of bristles comprise a first stiffness and the bristles of the second group of bristles comprise a second stiffness, the first and second stiffnesses being different.

3. The brush seal according to claim 1, comprising a metal-based material or a carbon-based material.

4. The brush seal according to claim 1, wherein the first group of bristles comprises a first bristle density and the second group of bristles comprises a second bristle density, the first and second densities being different.

5. A rotating machine comprising a brush seal according to claim 1.

* * * * *